Sept. 16, 1958     C. E. PETERSON     2,851,823
ADJUSTABLE PLANT SUPPORT
Filed March 27, 1957
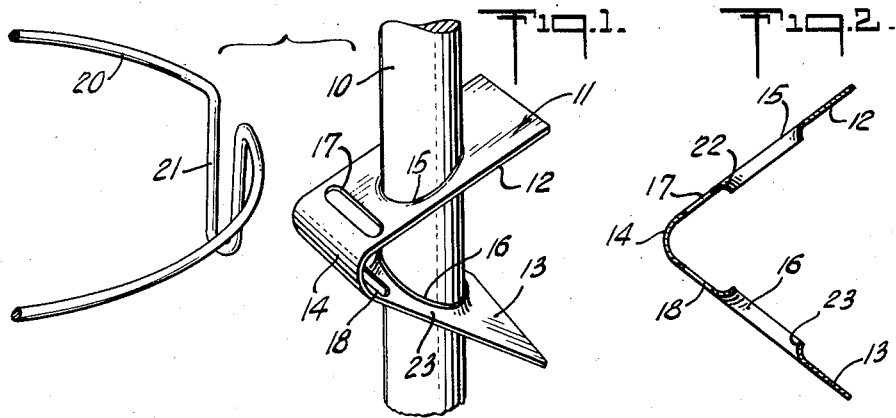
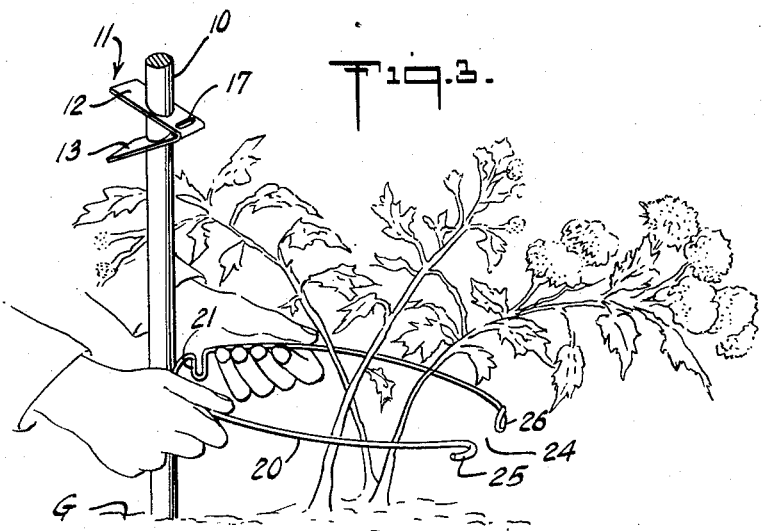
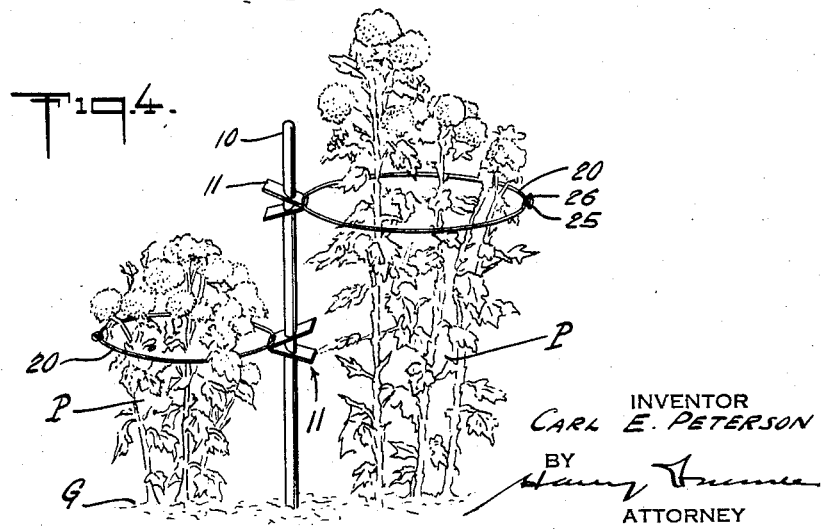
INVENTOR
CARL E. PETERSON
BY
ATTORNEY

United States Patent Office 2,851,823
Patented Sept. 16, 1958

2,851,823
ADJUSTABLE PLANT SUPPORT
Carl E. Peterson, Upper Montclair, N. J.
Application March 27, 1957, Serial No. 648,969
1 Claim. (Cl. 47—47)

This invention relates to an adjustable support for long-stemmed plants such as chrysanthemums, asters, zinnias, dahlias and others. Pursuant to the invention, an adjustable plant support is provided which may be readily adjusted so as to provide support for the plant effectively and precisely at the desired height from the ground. A further feature of the invention is the provision of an adjustable plant support which may be shipped "knocked-down" and may then be readily assembled and installed at precisely the location desired relative to the plant, or removed therefrom in a very rapid and convenient fashion. The plant support of the present invention is relatively fool proof and sturdy in construction and operation, and highly effective for the intended purpose.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby, and such other forms as come within the scope of the appended claim are to be considered within the scope and purview of the instant invention.

In the drawings:

Fig. 1 is a fragmentary, exploded, perspective view of parts of the adjustable plant support of the invention, Fig. 2 is a medial, longitudinal, sectional view of the bracket member of said support, shown in its normal, fully opened position, Fig. 3 is a partly fragmentary, perspective view, showing the manner in which the ring member of the invention may be applied initially around a plant as a first step in encircling the plant stalks near the ground, following which the ring member may be raised to the desired level of the supporting bracket and inserted therein, and Fig. 4 is a similar view showing the manner in which the ring member is secured to the bracket member, showing also two bracket members secured to a rod member pursuant to the invention.

As shown in the drawings, the adjustable plant support of the invention comprises an elongated rod 10 to be positioned in the ground G (Fig. 4) adjacent the plant or group of plants P to be supported. A bracket 11 to be secured to said rod, comprises a pair of leg members 12, 13 connected at one end 14 (Figs. 1 and 2). The bracket is made of spring material so as to be disposed normally open with legs 12, 13 in V-shaped relation as shown in Fig. 2. The bracket is compressible to partially close the V and has openings 15, 16 to receive the rod 10 when the bracket is partially compressed. The bracket may thus be so compressed by the user and slid along the rod to the desired location (for example, as shown in Fig. 3) and then released so as to tend to open and thus frictionally engage the rod. The bracket is provided with a pair of further openings 17, 18 intermediate the first mentioned pair of openings and the closed end portion 14 of the bracket. The ring 20 is provided to encircle the plant (Fig. 3) initially near the ground and then to be slowly raised to the desired position at the level of the bracket 12. The ring is provided with a depending stud 21 for reception in the second pair of openings 17, 18 of the bracket, to secure the ring to the bracket and thereby support the plant at the desired location of the rod. The pair of further openings 17, 18 are preferably elongated (Fig. 1) and the stud is preferably of complementary transverse cross section.

As shown in Fig. 4, a single rod may have more than one bracket secured thereto for the support of stems of various heights of the same plant or for the support of more than one plant.

As shown in the drawings, stud 21 is preferably disposed at substantially right angles to the longitudinal plane of the ring proper. The bracket is preferably provided with flanges 22, 23 defining the openings 15 and 16, said flanges being directed, preferably, at substantial right angles to the longitudinal planes of the leg members 12, 13. The ring 20 is open at a point 24 (Fig. 3) substantially diametrically opposite depending stud 21, and complementary latching means 25, 26 are provided at the free ends of the ring to close the ring.

In operation, the plant is first encircled by the open ring as shown in Fig. 3 at a point near the ground, then the free ends 25, 26 of the ring are interlatched and the ring is elevated to the level of the bracket 11.

Having thus described my invention, what I claim as new and desire to secure by Letters Patent is:

An adjustable plant support comprising an elongated rod to be positioned in the ground adjacent the plant to be supported, a bracket comprising a pair of leg members connected at one end and made of spring material so as to be disposed in normal open V-shaped relation and being compressible to close the V and returning to open form when pressure is released, said bracket having registering openings to receive the rod when the bracket is compressed so that said bracket may be compressed and slid along the rod to the desired location and then, when no longer compressed, will expand and frictionally engage the rod, said bracket being provided with flanges marginally of said openings for engagement with the rod, said bracket being provided with a pair of further openings intermediate the first mentioned pair of registered, spaced openings and the closed end portion of the bracket, a ring to encircle and support the plant, and an elongated stud depending angularly from said ring to be positioned in the second mentioned pair of spaced openings of the bracket to hold the ring non-rotatably in the bracket and support the plant at the desired location of the rod, said pair of further openings being elongated, and said stud being of complementary transverse cross section.

References Cited in the file of this patent
UNITED STATES PATENTS

| | | |
|---|---|---|
| 1,627,495 | Effley | May 3, 1927 |
| 1,820,096 | Soule | Aug. 25, 1931 |
| 1,983,985 | Meixell | Dec. 11, 1934 |

FOREIGN PATENTS

| | | |
|---|---|---|
| 374,634 | Great Britain | June 16, 1932 |
| 449,978 | Great Britain | July 8, 1936 |